United States Patent
Wakana et al.

(10) Patent No.: US 8,668,968 B2
(45) Date of Patent: Mar. 11, 2014

(54) COMPOSITION FOR PLUG IN BASE-ISOLATED STRUCTURE, PLUG FOR BASE-ISOLATED STRUCTURE AND BASE-ISOLATED STRUCTURE

(75) Inventors: Yuichiro Wakana, Tokyo (JP);
Shigenobu Suzuki, Yokohama (JP);
Hironori Hamazaki, Tokyo (JP);
Hideaki Kato, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 189 days.

(21) Appl. No.: 12/740,273

(22) PCT Filed: Oct. 23, 2008

(86) PCT No.: PCT/JP2008/069205
§ 371 (c)(1),
(2), (4) Date: May 17, 2010

(87) PCT Pub. No.: WO2009/057500
PCT Pub. Date: May 7, 2009

(65) Prior Publication Data
US 2010/0255233 A1    Oct. 7, 2010

(30) Foreign Application Priority Data
Oct. 30, 2007    (JP) ................... 2007-282264

(51) Int. Cl.
*B32B 1/06* (2006.01)
*B32B 3/24* (2006.01)
*B32B 5/30* (2006.01)
*B32B 7/02* (2006.01)
*F16F 1/40* (2006.01)
*E04H 9/02* (2006.01)

(52) U.S. Cl.
USPC .......... 428/34.1; 428/137; 428/138; 428/139; 428/212; 428/217; 428/323; 428/328; 428/331; 428/332; 428/402; 52/167.1

(58) Field of Classification Search
None
See application file for complete search history.

(56) References Cited

U.S. PATENT DOCUMENTS

| | | | | |
|---|---|---|---|---|
| 3,668,168 A | * | 6/1972 | Self | 524/440 |
| 5,182,888 A | * | 2/1993 | Miyamoto et al. | 52/167.2 |
| 5,765,322 A | * | 6/1998 | Kubo et al. | 52/167.7 |
| 2008/0090057 A1 | * | 4/2008 | Suzuki et al. | 428/212 |

FOREIGN PATENT DOCUMENTS

| | | | | |
|---|---|---|---|---|
| CN | 1530400 A | | 9/2004 | |
| JP | 63-319129 A | | 12/1988 | |
| JP | 64-001843 A | | 1/1989 | |
| JP | 4-248036 A | | 9/1992 | |
| JP | 04248036 A | * | 9/1992 | ...... F16F 15/08 |

(Continued)

OTHER PUBLICATIONS

English Abstract 1 for JP 04248036 A, Sep. 1992.*

(Continued)

*Primary Examiner* — David Sample
*Assistant Examiner* — Jeff Vonch
(74) *Attorney, Agent, or Firm* — Sughrue Mion, PLLC

(57) ABSTRACT

This invention relates to a composition for plug in a base-isolated structure capable of providing a plug for base-isolated structure having sufficient damping performance, displacement following property and the like, and more particularly to a composition for plug in a base-isolated structure characterized by including powder and an elastomer composition formed by compounding an elastomer component with a reinforcing filler.

6 Claims, 1 Drawing Sheet

(56) References Cited

FOREIGN PATENT DOCUMENTS

| JP | 07084815 B | * | 9/1995 | |
| JP | 08209817 A | * | 8/1996 | ................ E04B 1/82 |
| JP | 26155626 B | * | 3/1997 | |
| JP | 2006-316990 A | | 11/2006 | |
| JP | 2006316990 A | * | 11/2006 | |

OTHER PUBLICATIONS

English Abstract 2 for JP 04248036 A, Sep. 1992.*
Machine Translation for JP 26155626 B.*
MSDS for carboxy modified styrene butadiene latex (no date).*
Gaishun et al., Preparation and Properties of Colloidal Silver, 2002 (no month).*
Full Translation of JP 04-248036 A, Sep. 1992.*
Machine Translation of JP 07084815 B, Sep. 1995.*
Machine Translation of JP 08209817 A, Aug. 1996.*
Office Action issued on Jul. 26, 2011 from the Chinese Patent Office in counterpart Chinese Application No. 200880120194.1.
Office Action issued on Jul. 24, 2012 from the Japanese Patent Office in a counterpart Japanese Application No. 2008-273015.
Office Action issued on Jun. 5, 2012 from the People's Republic of China Patent Office in a Chinese Application No. 200880120194.1.

* cited by examiner

COMPOSITION FOR PLUG IN BASE-ISOLATED STRUCTURE, PLUG FOR BASE-ISOLATED STRUCTURE AND BASE-ISOLATED STRUCTURE

CROSS REFERENCE TO RELATED APPLICATIONS

This application is a National Stage of International Application No. PCT/JP2008/069205 filed Oct. 23, 2008, claiming priority based on Japanese Patent Application No. 2007-282264 filed Oct. 30, 2007, the contents of all of which are incorporated herein by reference in their entirety.

TECHNICAL FIELD

This invention relates to a composition for plug in a base-isolated structure, a plug for base-isolated structure using such a composition and a base-isolated structure using such a plug, and more particularly to a composition for plug in a base-isolated structure which is capable of providing a plug with sufficient damping performance, displacement following property and the like.

RELATED ART

Heretofore, a base-isolated structure formed by alternately laminating soft plates having a viscoelastic property such as rubber or the like and hard plates such as steel plate or the like is used as a support or the like of a seismic isolator. As such a base-isolated structure, there are ones obtained, for example, by forming a hollow portion in a center of a laminate comprised of the soft plates and hard plates and press-fitting a plug into an inside of the hollow portion.

As the plug is frequently used a plug made from lead as a whole. When the laminate is subjected to shear deformation, the plug is plastic-deformed to absorb vibration energy. However, lead is large in the environmental load and high in the cost required for disposal or the like. Therefore, it is attempted to create a plug having sufficient damping performance, displacement following property and the like by using an alternate material instead of lead. For example, JP-B-H07-84815 proposes a seismic isolator in which a viscous fluid and a solid material are encapsulated into the hollow portion of the laminate so as to fill the viscous fluid into gaps of the solid material.

In JP-B-H07-84815, however, a liquid material such as mineral oil, vegetable oil or the like is exemplified as the viscous fluid, but the solid material is precipitated into the liquid material in use over a long period of time to deteriorate the dispersibility. As a result, the damping performance is locally changed and there is a problem that stable damping performance can not be developed.

As to this problem, JP-A-2006-316990 discloses a seismic isolator wherein a plastic fluid and a hard filler are filled in the hollow portion of the laminate. In this publication, as the plastic fluid is preferable a material having a shear yielding stress of a particular range and as the hard filler are exemplified a metal, a hard resin, and a hard fiber.

DISCLOSURE OF THE INVENTION

In the conventional alternate technique of lead plug as mentioned above, however, a plug for base-isolated structure having sufficient damping performance, displacement following property and the like as a plug can not be obtained, so that there is room for improvement in the performances.

It is, therefore, an object of the invention to solve the problems of the conventional technique and to provide a composition for plug in a base-isolated structure capable of providing a plug for base-isolated structure with sufficient damping performance, displacement following property and the like. Also, it is another object of the invention to provide a plug for base-isolated structure using such a composition and a base-isolated structure using such a plug.

The inventors have made various studies in order to achieve the above objects and found that a base-isolated structure having sufficient damping performance, displacement following property and the like is obtained by using in a plug for base-isolated structure a composition including an elastomer composition formed by compounding an elastomer component with a reinforcing filler, and powder other than the reinforcing filler, and as a result the invention has been accomplished.

That is, the composition for plug in a base-isolated structure according to the invention is characterized by including powder and an elastomer composition formed by compounding an elastomer component with a reinforcing filler.

In a preferable embodiment of the composition for plug according to the invention, at least a part of the elastomer component is uncrosslinked. In this case, when the plug is subjected to a large deformation history and thereafter a position of the plug again returns to an original point, the plug can be turned to an original shape, and hence it is possible to maintain performances equal to initial ones over a long period of time.

In the composition for plug according to the invention, as the reinforcing filler are preferable carbon black and silica. Since carbon black and silica have a large effect of increasing the viscosity of the elastomer composition through an interaction with the elastomer component, the fluid resistance of the plug becomes large, and hence the damping effect of the plug becomes large.

In the composition for plug according to the invention, as the powder are preferable a metal powder and a metallic compound powder, and iron powder is particularly preferable. The iron powder is cheap and high in the fracture strength. Also, by using the iron powder in the plug can be developed an excellent damping performance over a long period of time.

In another preferable embodiment of the composition for plug according to the invention, the content of the powder is 50-74 volume %, more preferably 60-74 volume %. In this case, friction between fine particles and fluid resistance between the powder and the other component during the deformation are sufficiently large, and hence the sufficient damping effect is obtained, and also the repetitive durability is ensured sufficiently, and further the shape workability is good.

In the other preferable embodiment of the composition for plug according to the invention, the amount of the reinforcing filler compounded in the elastomer composition is 60-100 parts by mass per 100 parts by mass of the elastomer component. In this case, the viscosity and fluid resistance of the elastomer composition are sufficiently high and the plug can develop the sufficient damping effect, but also the milling is easy and the uniform composition can be easily obtained, and further the repetitive stability of the plug is good.

In the composition for plug according to the invention, the particle size of the powder is preferably 0.1 μm-2 mm, more preferably 1 μm-150 μm. In this case, the handling of the powder is easy, and the damping performance of the plug is sufficiently high. At this moment, the particle size of the powder is determined by the measurement of particle size through a laser diffraction (JIS Z8825-1), and is a value obtained by measuring average of major axis-minor axis of particles in the powder (captured as spheres) through the laser diffractometry.

In a further preferable embodiment of the composition for plug according to the invention, the form of the powder is unshaped. In this case, the damping performance of the plug is good.

Also, the plug for base-isolated structure according to the invention is characterized by making from the above composition for plug. Further, the base-isolated structure according to the invention comprises a laminate formed by alternately laminating rigid plates having a rigidity and elastic plates having an elasticity and having a hollow portion extending in the lamination direction, and a plug press-fitted into the hollow portion of the laminate, and is characterized in that the plug is the above-mentioned plug for base-isolated structure.

According to the invention, there can be provided a composition for plug in a base-isolated structure including an elastomer composition formed by compounding an elastomer component with a reinforcing filler, and powder other than the reinforcing filler and capable of making a plug for a base-isolated structure with sufficient damping performance, displacement following property and the like. Further, there can be provided a plug for base-isolated structure using such a composition and having sufficient damping performance, displacement following property and the like as well as a base-isolated structure using such a plug.

BEST MODE FOR CARRYING OUT THE INVENTION

Composition for Plug

Figure 1:
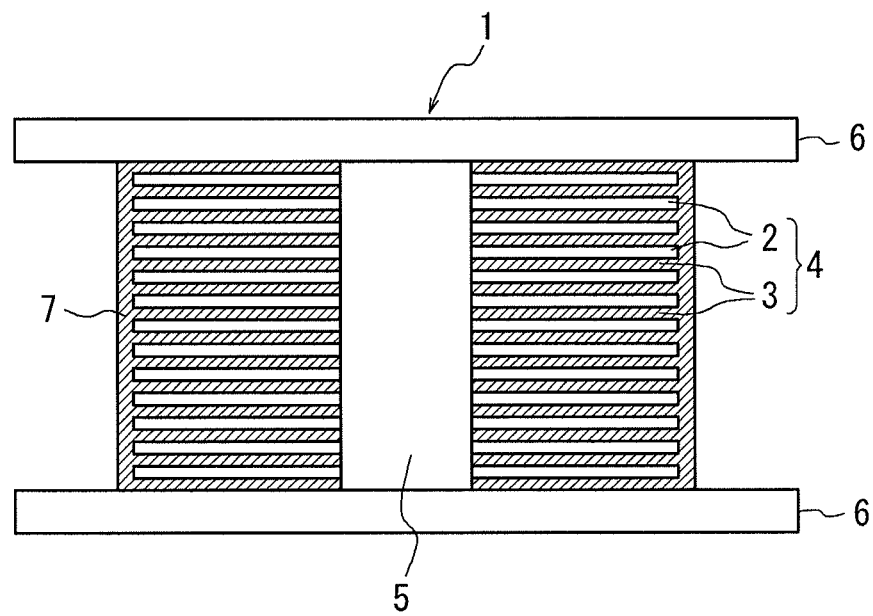
FIG. 1 is a schematically sectional view of an embodiment of the base-isolated structure according to the invention.

The composition for plug according to the invention will be described in detail below. The composition for plug in a base-isolated structure according to the invention is characterized by including powder and an elastomer composition formed by compounding an elastomer component with a reinforcing filler.

The inventors prepared plugs only from various kinds of powders in order to provide a plug for base-isolated structure having sufficient damping performance, displacement following property and the like, and used these plugs in base-isolated structures, but could not obtain a plug having a sufficient durability because the powders are rubbed with each other to cause breakage. In order to solve this problem, the inventors have made further examinations and found that a plug is prepared from a composition including powder and an elastomer composition formed by compounding an elastomer component with a reinforcing filler and the resulting plug is used in a base-isolated structure to obtain a plug for base-isolated structure having sufficient durability, damping performance, displacement following property and the like. Moreover, when using an elastomer composition not including the reinforcing filler, the damping effect by the plug is small, so that the composition for plug according to the invention is required to include the reinforcing filler.

As the elastomer component used in the composition for plug according to the invention can be used ones showing rubbery elasticity at room temperature, for example, rubbers such as natural rubber, synthetic rubber and the like, and thermoplastic elastomers. Among them, rubbers such as natural rubber and synthetic rubbers are preferably used. The natural rubber and synthetic rubber-based polymers show some elasticity as a viscoelastic body but are large in the plasticity and can follow to a large deformation, so that they can be again aggregated to the same state when being returned to the original point after vibrations. Further, when the elastomer component is rubber (i.e. the elastomer composition is a rubber composition), the damping performance of the plug is improved and also the durability is improved. As the elastomer component are concretely mentioned natural rubber (NR), polyisoprene rubber (IR), polybutadiene rubber (BR), styrene-butadiene rubber (SBR), chloroprene rubber (CR), ethylene-propylene rubber, nitrile rubber, butyl rubber, halogenated butyl rubber, acrylic rubber, polyurethane, silicone rubber, fluoride rubber, Hypalon, ethylene-vinyl acetate rubber, epichlorohydrin rubber, ethylene-methyl acrylate copolymer, styrene-based elastomer, urethane-based elastomer, polyolefin-based elastomer and so on. These elastomer components may be used alone or in a blend of two or more.

It is preferable that at least a part of the elastomer component, preferably a whole thereof is uncrosslinked, more concretely uncured. If the elastomer component is completely crosslinked, it is deformed in the large deformation, but the position of the powder can not change during the deformation, and hence the following to the deformation is impossible at a certain limit point, and the crosslinked elastomer portion is broken, or returned to the original form by a repulsive force of the crosslinked elastomer portion. As the crosslinked elastomer portion is broken, even if the position of the plug returns to the original point, the plug can not be returned to the original form, so that the damping performance is gradually deteriorated. Also, when the repulsive force of the crosslinked elastomer portion is served, the damping performance inherent to the plug can not be developed. On the other hand, when the elastomer component is uncrosslinked, the following property to the deformation is possible, and when the plug is subjected to a history of large deformation and then again returned to the original point, since a hydrostatic pressure is applied to the whole of the plug, the form of the plug can be turned to the original one, and as a result, the performances equal to initial ones can be maintained over a long period of time. Moreover, when the number of crosslinking points is very small, or when only the surface of the plug is crosslinked, the plug is returned to the original form after the deformation. In the invention, therefore, the term "uncrosslinked" means a state that the crosslinking reaction is not yet completed, and includes a partially crosslinked state.

The reinforcing filler used in the composition for plug according to the invention conducts the reinforcement to the elastomer component and is a substance strongly having its own aggregation force and a bonding force to the elastomer component, and when it is compounded into the elastomer component, the viscosity of the whole of the elastomer composition is increased by the bonding force to thereby improve the damping performance of the plug. In general, the plug in a base-isolated structure develops the damping effect through absorption of energy generated by earthquake (for example, conversion to heat or the like), so that the larger the fluid resistance of the plug, the larger the damping effect. On the contrary, when the reinforcing filler is compounded into the elastomer component, the fluid resistance of the elastomer composition becomes larger, and hence it is possible to provide a plug having sufficient damping performance, displacement following property and the like.

As the reinforcing filler are preferable carbon black and silica in a point that the effect of improving the viscosity of the elastomer composition by the interaction with the elastomer component is large, and carbon black is particularly preferable. As the carbon black are mentioned ones of SAF grade, ISAF grade, HAF grade and the like. Among them, fine particles of SAF grade, ISAF grade or the like and having a large surface area are preferable. As the silica are mentioned wet silica, dry silica, colloidal silica and so on. These reinforcing fillers may be used alone or in a combination of two or more.

The amount of the reinforcing filler compounded in the elastomer composition is preferable to be within a range of 60-150 parts by mass per 100 parts by mass of the elastomer component. When the amount of the reinforcing filler is less than 60 parts by mass, the viscosity and fluid resistance of the elastomer composition are low, and the damping performance of the plug is apt to become insufficient. While, when the amount of the reinforcing filler exceeds 150 parts by mass, the milling is difficult and the uniform composition is hardly obtained, and also the repetitive stability of the plug is deteriorated.

The elastomer composition is preferable to be further compounded with a resin. When the elastomer composition includes only the reinforcing filler, the damping performance tends to be deteriorated in the large deformation of the plug. On the contrary, when the elastomer composition includes the resin in addition to the reinforcing filler, the damping performance of the plug can be improved even in the large deformation. Also, the resin acts as a processing aid, which can facilitate the milling of the composition for the plug.

The resin is preferable to have an action as a tackifier and includes concretely phenolic resin, rosin resin, dicyclopentadiene (DCPD) resin, dicyclopentadiene-isoprene copolymer, C5-based petroleum resin, C9-based petroleum resin, alicyclic petroleum resin, petroleum resin obtained by copolymerizing C5 fraction with C9 fraction, xylene resin, terpene resin, ketone resin and modified resins thereof. These resins may be used alone or in a combination of two or more. Moreover, the amount of the resin compounded in the elastomer composition is preferable to be within a range of 20-100 parts by mass per 100 parts by mass of the elastomer component. When the amount of the resin is less than 20 parts by mass, the effect of improving the damping performance of the plug is small, while when it exceeds 100 parts by mass, the processability of the elastomer composition is deteriorated.

The elastomer composition may be compounded with additives generally added to the elastomer composition such as an anti-aging agent, wax, a plasticizer, a softening agent and the like in addition to the elastomer component, reinforcing filler and resin. When the anti-aging agent is compounded into the elastomer composition, it is possible to suppress the change of properties in the plug small even after the lapse of long period. Moreover, it is especially effective that an antioxidant, an antiozonant, a stabilizer, a flame retardant and the like are compounded together with the anti-aging agent for attaining such an object.

As the plasticizer are mentioned derivatives of phthalic acid, isophthalic acid, adipic acid, tetrahydrophthalic acid, sebacic acid, azelaic acid, maleic acid, trimellitic acid, citric acid, itaconic acid, oleic acid, ricinoleic acid, stearic acid, phosphoric acid, sulfonic acid and the like (e.g. esters); glycol, glycerine, epoxy derivatives and polymeric plasticizer. These plasticizers may be used alone or in a blend of two or more.

As the softening agent (oil) may be mentioned mineral oil-based softeners such as aromatic oil, naphthenic oil, paraffinic oil and the like; vegetable oil-based softeners such as castor oil, cottonseed oil, linseed oil, rapeseed oil, soybean oil, palm oil, peanut oil, rosin, pine oil and the like; and a low molecular weight oil such as silicone oil or the like. These softening agents may be used alone or in a blend of two or more.

The powder used in the composition for plug according to the invention is a material mainly assuming the damping performance of the plug. Concretely, vibrations are damped by friction between fine particles and friction between the power and the elastomer component. The powder in the invention means ones other than the above reinforcing filler and includes, for example, metallic powder, silicon carbide powder and so on. If the composition for plug does not include the powder, the damping performance of the plug is largely lowered, and the sufficient damping performance, displacement following property and the like can not be obtained.

As the powder is preferable a metal powder. Also, the metal powder is preferable to be small in the environmental load and includes, for example, iron powder, stainless steel powder, zirconium powder, tungsten powder, bronze (CuSn) powder, aluminum powder, gold powder, silver powder, tin powder, tungsten carbide powder, tantalum powder, titanium powder, copper powder, nickel powder, niobium powder, iron-nickel alloy powder, zinc powder, molybdenum powder and so on. These metal powders may be used alone or in a combination of two or more. Moreover, since the metal powder may be a metal oxide powder, a metallic compound powder such as metal oxide powder or the like can preferably used as the powder. Among these powders, iron powder is particularly preferable. The iron powder is cheap and high in the fracture strength as compared with the other metal powders, and also the plug for base-isolated structure composed mainly of iron powder can develop an excellent damping performance over a long period of time because it is neither too firm or brittle. As the iron powder are mentioned direct-reduced iron powder, electrolytic iron powder, atomized iron powder, pure iron powder, cast iron powder and the like, and among them direct-reduced iron powder is preferable.

In the composition for plug according to the invention, the content of the powder is preferably a range of 50-74 volume %, more preferably a range of 60-74 volume % (i.e. a volume ratio of elastomer composition/powder is preferably a range of 50/50-26/74, more preferably a range of 40/60-26/74). When the content of the powder in the composition for plug is less than 50 volume %, the distance between fine particles is too wide and the friction between fine particles in the deformation and the fluid resistance between the powder and the other component become smaller, and hence the damping performance is insufficient. While, when the content of the powder in the composition for plug exceeds 74 volume %, the contact between the fine particles is increased to deteriorate the repetitive durability, and also when a plug is shaped from the composition for plug, it is difficult to sufficiently remove air from the composition for plug, and hence the volume of the plug becomes considerably larger than an ideal volume (volume incorporating no air) to lower the damping performance of the plug. Moreover, when the content of the powder in the composition for plug is 60-74 volume %, the good damping performance can be maintained but also the following property, repetitive stability and workability become good.

The particle size of the powder is preferably a range of 0.1 μm-2 mm, more preferably a range of 1 μm-150 μm. When the particle size of the powder is less than 0.1 μm, the handling is difficult, while when the particle size of the powder exceeds 2 mm, there is a tendency that the friction between fine particles is decreased to lower the damping effect. Moreover, when the particle size of the powder is not less than 1 μm, the handling is easy, while when the particle size of the powder is not more than 150 μm, the damping performance of the plug is sufficiently high.

The form of the powder is preferable to be unshaped form. At this moment, the unshaped form means not only one kind of forms such as spherical form but also a mixture of various forms such as irregular form, projection-containing form and the like. The form of powder obtained by pulverizing bulk is naturally unshaped form. The good damping effect is obtained by using the powder of unshaped form as compared with a case using powder of spherical form. This is considered due to the fact that when the powder of unshaped form is used, the engagement effect is caused in the frictions between fine particles and between the powder and the elastomer component and hence the friction becomes larger as compared with the use of spherical form and the damping performance becomes good.

The composition for plug according to the invention is not particularly limited as long as the powder and the elastomer composition formed by compounding the elastomer component with the reinforcing filler are used, and can be produced, for example, as follows.

In the first step, the elastomer component is compounded with the reinforcing filler and, if necessary, various additives properly selected, which are milled to prepare an elastomer composition.

In the second step, the elastomer composition is compounded and further milled with powder. It is preferable in the second step that the powder is compounded by dividing into plural parts. It is possible to produce a uniform composition for plug by compounding plural divided parts of the powder.

In the first and second steps for the formation of the composition for plug may be used a usual milling apparatus such as kneader, Banbury mixer or the like. Also, the milling conditions are not particularly limited, and may be set so as to sufficiently mill the composition according to the invention by properly changing the conditions usually used in the art. For example, as the milling condition in the second step are preferable the revolution number of 20-40 rpm and the temperature of about 100° C. The revolution number is preferable to be lower in order to suppress the lowering of the viscosity of the elastomer component. Also, in order to improve the dispersion of the powder into the elastomer composition, a temperature enough to soften the elastomer composition is preferable, but if the temperature is too high, the elastomer component is deteriorated or a long time for cooling is taken to lower the productivity. Moreover, it is preferable that pressureless milling is conducted by releasing a pressure before the discharge of the milled composition. In case of the pressureless milling, the composition is not agglomerated and it is easy to take out the composition.

<Plug for Base-Isolated Structure>

The plug for base-isolated structure according to the invention is characterized by making from the aforementioned composition for plug and has sufficient damping performance, displacement following property and the like. The plug for base-isolated structure according to the invention can be produced, for example, by using the above composition for plug as follows.

The composition for plug prepared as mentioned above is taken out from the milling apparatus and transferred to a shaping apparatus, at where it is pressed into a plug by applying temperature and pressure. As a pressing machine used in this step can be adopted ones usually used in the art. Also, the pressing conditions are not particularly limited, and may be set to conditions suitable for the formation of the plug by properly changing the conditions usually used in the art. For example, as the pressing conditions, the pressing temperature is preferable to be room temperature to 150° C. and the shaping pressure is preferable to be not less than 0.7 t/cm².

<Base-Isolated Structure>

The base-isolated structure according to the invention comprises a laminate formed by alternately laminating rigid plates having a rigidity and elastic plates having an elasticity and having a hollow portion extending in the lamination direction, and a plug press-fitted into the hollow portion of the laminate, and is characterized in that the plug is the above-mentioned plug for base-isolated structure, and is high in the damping performance, displacement following property and the like. The base-isolated structure according to the invention will be described in detail with reference to the accompanying drawings below.

A base-isolated structure 1 shown in FIG. 1 comprises a laminate 4 formed by alternately laminating rigid plates 2 having a rigidity and elastic plates 3 having an elasticity and having a cylindrical hollow portion extending in the lamination direction (vertical direction) in its central portion, a plug 5 press-fitted into the hollow portion of the laminate 4, and flange plates 6 fixed to both ends (upper end and lower end) of the laminate 4 and the plug 5, in which an outer peripheral surface of the laminate 4 is covered with a covering member 7.

The rigid plates 2 and the elastic plates 3 constituting the laminate 4 are strongly bonded to each other, for example, by adhesion through vulcanization or by an adhesive. In the adhesion through vulcanization, the rigid plate 2 and an uncured rubber composition are laminated and then vulcanized, whereby a vulcanizate of the uncured rubber composition forms an elastic plate 3. As the rigid plate 2 may be used a metal plate such as steel plate or the like, a ceramic plate, a reinforced plastic plate such as FRP or the like, and so on. As the elastic plate 3 may be used a plate of vulcanized rubber and so on. The laminate constituting the base-isolated structure according to the invention may not be covered with the covering member 7. When the outer peripheral surface of the laminate 4 is covered with the covering member 7, rain or light does not arrive in the laminate 4 from exterior, and hence the deterioration of the laminate 4 through oxygen, ozone or ultraviolet ray can be prevented. Moreover, as the covering member 7 may be used the same material as the elastic plate 3, for example, vulcanized rubber or the like.

The laminate 4 is shear-deformed to absorb vibration energy when shearing force in a horizontal direction is applied through vibrations. Since the laminate 4 is formed by alternately laminating the rigid plates 2 and the elastic plates 3, even when a load is applied in the lamination direction (vertical direction), compression is controlled.

When the base-isolated structure 1 is subjected to shearing force in the horizontal direction by vibrations, since the plug 5 is press-fitted into the hollow portion of the laminate 4, the plug 5 is shear-deformed together with the laminate 4 to effectively absorb vibration energy, whereby vibrations can be damped rapidly. At this moment, the base-isolated structure according to the invention has the sufficient damping performance, displacement following property and the like because a plug made from a composition including powder and an elastomer composition formed by compounding an elastomer component with a reinforcing filler is used as the plug 5.

EXAMPLES

The following examples are given in illustration of the invention and are not intended as limitations thereof.

Examples 1-15

An elastomer composition having a compounding recipe as shown in Tables 1-2 is prepared with a kneader and thereafter milled with iron powder at a volume ratio as shown in Tables 1-2 to prepare a composition for plug. Then, the composition for plug is pressed at a temperature of 100° C. under a pressure of 1.3 ton/cm² to prepare a cylindrical plug for base-isolated structure having a diameter of 45 mm.

Comparative Example 1

An elastomer composition having a compounding recipe as shown in Table 3 is prepared with a kneader and then a plug for base-isolated structure is prepared by pressing the elastomer composition in the same manner as in Examples 1-15.

Comparative Example 2

A plug for base-isolated structure is prepared by pressing iron powder in the same manner as in Examples 1-15.

Comparative Example 3

A composition for plug is prepared by milling an elastomer component and iron powder at a volume ratio shown in Table 3 with a kneader. Then, the composition for plug is pressed in the same manner as in Examples 1-15 to prepare a plug for base-isolated structure.

Comparative Example 4

A composition for plug is prepared by milling a plasticizer and iron powder at a volume ratio shown in Table 3 with a kneader. Then, the composition for plug is pressed in the same manner as in Examples 1-15 to prepare a plug for base-isolated structure.

Examples 16-17

An elastomer composition having a compounding recipe as shown in Table 3 is prepared with a kneader and thereafter milled with alumina powder or silicon carbide powder at a volume ratio as shown in Table 3 to prepare a composition for plug. Then, the composition for plug is pressed in the same manner as in Examples 1-15 to prepare a plug for base-isolated structure.

Comparative Example 5

Figure 2:
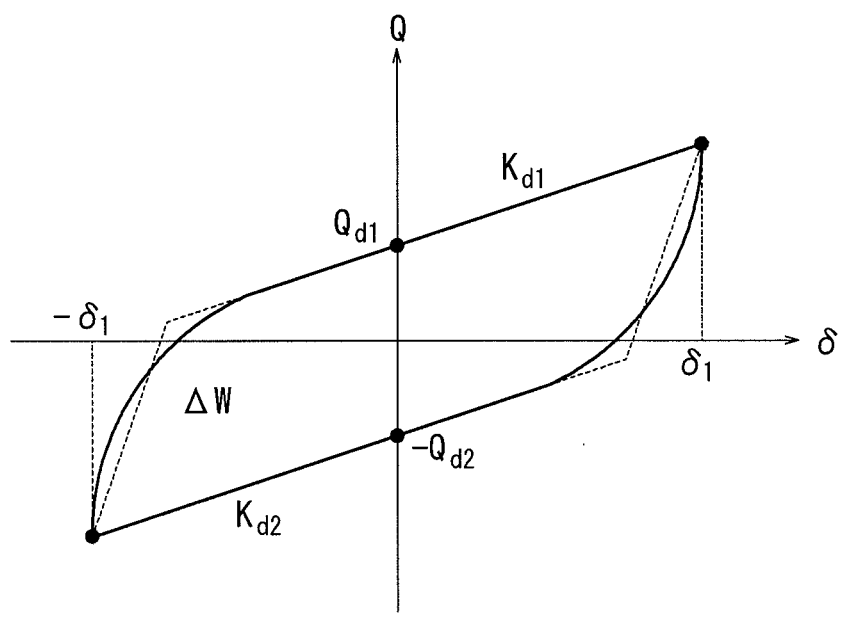
FIG. 2 is a graph showing a relation between deformation displacement in horizontal direction (δ) and load in horizontal direction (Q) in a base-isolated structure using a plug.

An iron cylinder is provided as a plug for base-isolated structure.
<Evaluation>
The aforementioned plug for base-isolated structure is press-fitted into a hollow portion of a laminate formed by alternately laminating rigid plates [iron plates] having a rigidity and elastic plates having an elasticity [vulcanized rubber (G'=0.4 MPa)], each having a cylindrical hollow portion in its center and an outer diameter of 225 mm, to prepare a base-isolated structure having a structure shown in FIG. 1. Moreover, the volume of the plug is 1.01 times of the volume of the hollow portion in the laminate. With respect to the above plugs for base-isolated structure are evaluated the damping performance, following property, repetitive stability and shape workability by the following methods. The results are shown in Tables 1-3.
(Damping Performance)
A shear deformation of a specified displacement is caused by applying vibrations in a horizontal direction to the above base-isolated structure at a state of applying a standard surface pressure in a vertical direction with a dynamic testing machine. Moreover, as conditions for displacement by applying vibrations, a total thickness of the laminate is 100%, a strain is 50-250%, a vibration frequency is 0.33 Hz, and a vertical surface pressure is 10 MPa. In FIG. 2 is shown a relation between deformation displacement in horizontal direction (δ) and load in horizontal direction of base-isolated structure (Q). As an area ΔW of a region surrounded by a hysteresis curve in FIG. 2 becomes wider, vibration energy can be absorbed far more. For shake of simplicity, the damping performance of the plug is evaluated by an intercept load $Q_d$ at a 200% strain (horizontal load value at a displacement of zero). Moreover, the intercept load $Q_d$ is calculated by the following equation:

$$Q_d = (Q_{d1} + Q_{d2})/2$$

using loads $Q_{d1}$, $Q_{d2}$ at intersecting points of the hysteresis curve with vertical axis. The larger the value of $Q_d$, the wider the area of the region surrounded by the hysteresis curve, which shows that the damping performance is excellent.
(Following Property)
When the laminate is subjected to shear deformation, it is evaluated whether or not the plug can follow to such a deformation. A case that the plug can follow to the deformation is ○ (good) and a case that the plug can not follow to the deformation is x (bad).
(Repetitive Stability)
As a preliminary test, shear deformation is conducted at 3 cycles of each of 50%, 100%, 150%, 200% and 250% strains. Then, shear deformation is conducted at each 3 cycles in the order of 100% strain (1), 200% strain and 100% strain (2). A case that a value of Qd (third cycle of 100% strain (2))/Qd (third cycle of 100% strain (1)) is not less than 0.5 is ○ (good) and a case that the value is less than 0.5 is x (bad).
(Shape Workability)
The workability is evaluated when the composition for plug is pressed to prepare a plug for base-isolated structure, wherein the good workability is ○ and the bad workability is x.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Form | | | elastomer composition/powder | | | | | | | | |
| Compounding of elastomer composition | Natural rubber *1 | parts by mass | 30 | 30 | 30 | 30 | 30 | 30 | 30 | 30 | 30 |
| | Polybutadiene rubber *2 | | 70 | 70 | 70 | 70 | 70 | 70 | 70 | 70 | 70 |
| | Carbon black *3 | | 120 | 120 | 120 | 120 | 120 | 60 | 150 | 120 | 120 |
| | Resin *4 | | 60 | 60 | 60 | 60 | 60 | 60 | 60 | 60 | 60 |
| | Plasticizer *5 | | 5 | 5 | 5 | 5 | 5 | 5 | 5 | 5 | 5 |
| | other additive *6 | | 20 | 20 | 20 | 20 | 20 | 20 | 20 | 20 | 20 |
| Kind of powder | | | iron powder 1 *7 | iron powder 1 *7 | iron powder 1 *7 | iron powder 1 *7 | iron powder 1 *7 | iron powder 1 *7 | iron powder 1 *7 | iron powder 1 *7 | iron powder 1 *7 |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
| Elastomer composition/powder | volume ratio | 35/65 | 26/74 | 50/50 | 40/60 | 37.5/62.5 | 35/65 | 35/65 | 52/48 | 20/80 |
| Damping performance Qd (200% strain) | tonf | 1.4 | 1.4 | 1.0 | 1.4 | 1.4 | 1.3 | 1.4 | 0.85 | 1.5 |
| Following property |  | ○ | ○ | ○ | ○ | ○ | ○ | ○ | ○ | ○ |
| Repetitive stability |  | ○ | ○ | ○ | ○ | ○ | ○ | ○ | ○ | ○ |
| Shape workability |  | ○ | ○ | ○ | ○ | ○ | ○ | ○ | ○ | X |

TABLE 2

|  |  |  | Example 10 | Example 11 | Example 12 | Example 13 | Example 14 | Example 15 |
|---|---|---|---|---|---|---|---|---|
| Form |  |  | elastomer composition/powder | | | | | |
| Compounding of elastomer composition | Natural rubber *1 | parts by mass | 30 | 30 | 30 | 30 | 30 | 30 |
|  | Polybutadiene rubber *2 |  | 70 | 70 | 70 | 70 | 70 | 70 |
|  | Carbon black *3 |  | 50 | 200 | 75 | 75 | 75 | 75 |
|  | Resin *4 |  | 35 | 60 | 40 | 40 | 40 | 40 |
|  | Plasticizer *5 |  | 5 | 5 | 5 | 5 | 5 | 5 |
|  | other additive *6 |  | 20 | 20 | 20 | 20 | 20 | 20 |
| Kind of powder |  |  | iron powder 1 *7 | iron powder 1 *7 | iron powder 1 *7 | iron powder 2 *8 | iron powder 3 *9 | iron powder 4 *10 |
| Elastomer composition/powder | volume ratio |  | 50/50 | 35/65 | 35/65 | 26/74 | 50/50 | 35/65 |
| Damping performance Qd (200% strain) | tonf |  | 0.8 | 1.2 | 1.3 | 1.4 | 1.0 | 1.0 |
| Following property |  |  | ○ | ○ | ○ | ○ | ○ | ○ |
| Repetitive stability |  |  | ○ | X | ○ | ○ | ○ | ○ |
| Shape workability |  |  | ○ | X | ○ | ○ | ○ | ○ |

TABLE 3

|  |  |  | Comparative Example 1 | Comparative Example 2 | Comparative Example 3 | Comparative Example 4 | Example 16 | Example 17 | Comparative Example 5 |
|---|---|---|---|---|---|---|---|---|---|
| Form |  |  | elastomer composition | powder | elastomer component/powder | plasticizer/powder | elastomer composition/powder | | iron cylinder |
| Compounding of elastomer composition | Natural rubber *1 | parts by mass | 30 | — | 30 | — | 30 | 30 | — |
|  | Polybutadiene rubber *2 |  | 70 | — | 70 | — | 70 | 70 | — |
|  | Carbon black *3 |  | 70 | — | — | — | 80 | 80 | — |
|  | Resin *4 |  | 35 | — | — | — | 60 | 60 | — |
|  | Plasticizer *5 |  | 5 | — | — | 100 | 5 | 5 | — |
|  | other additive *6 |  | 20 | — | — | — | 20 | 20 | — |
| Kind of powder |  |  | — | iron powder 1 *7 | iron powder 1 *7 | iron powder 1 *7 | alumina powder *11 | SiC powder *12 | — |
| Elastomer composition/powder | volume ratio |  | 100/0 | 0/100 | 35/65 *13 | 35/65 *14 | 35/65 | 60/40 | — |
| Damping performance Qd (200% strain) | tonf |  | 0.3 | 1.0 | 0.8 | 0.7 | 0.5 | 0.8 | — |
| Following property |  |  | ○ | ○ | ○ | ○ | ○ | ○ | X |
| Repetitive stability |  |  | ○ | X | ○ | X | ○ | ○ | — |
| Shape workability |  |  | ○ | ○ | ○ | ○ | ○ | X | — |

*1 natural rubber, uncured, RSS#4
*2 polybutadiene rubber (low-cis), uncured, DIENE NF35R made by Asahi Chemical Industry Co., Ltd.
*3 carbon black, ISAF, SEAST 6P made by Tokai Carbon Co., Ltd.
*4 resin, ZEOFINE made by Nippon Zeon Co., Ltd. Nisseki NEOPOLYMER 140 made by Shin-Nippon Petrochemical Co., Ltd. MARCALET M-890A made by Maruzen Petrochemical Co., Ltd. ZEOFIN:Nisseki NEOPOLYMER 140:MARCALET M-890A = 40:40:20 (mass ratio)
*5 plasticizer, dioctyl adipate (DOA)
*6 other additives, zinc oxide, stearic acid, antioxidant (ANSTAGE 6C made by Sumitomo Chemical Co., Ltd.), wax (PROTOWAX 1 made by Nippon Oil Corporation), zinc oxide:stearic acid:antioxidant:wax = 4:5:3:1 (mass ratio)
*7 iron powder 1, particle size = 40 μm, unshaped direct-reduced iron powder
*8 iron powder 2, particle size = 45 μm, spherical cast iron powder
*9 iron powder 3, particle size = 8 μm, unshaped direct-reduced iron powder
*10 iron powder 4, particle size = 8 μm, spherical carbonyl iron powder
*11 alumina powder, particle size = 50 μm
*12 silicon carbide powder, particle size = 1 μm
*13 volume ratio of elastomer component/powder
*14 volume ratio of plasticizer/powder As seen from Examples 1-15 in Tables 1-2, the damping performance of the base-isolated structure can be ensured sufficiently by using a plug made from a composition for plug including an elastomer composition formed by compounding an elastomer component with a reinforcing filler, and iron powder.

On the other hand, as seen from Comparative Example 1 of Table 3, when using a plug made from the elastomer composition, the damping performance of the base-isolated structure is largely deteriorated as compared with the examples. From this result, it is understood that the powder largely contributes to the damping effect.

From Comparative Example 2, it is seen that the repetitive stability is bad when using a plug made from iron powder. This is considered due to the fact that particles of iron powder are broken by rubbing with each other. Therefore, it is understood that an elastomer is required to be interposed in the powder.

Also, it is seen from Comparative Example 3 that when using the plug made from the elastomer component and iron powder without the reinforcing filler, the damping performance is deteriorated as compared with Examples 1, 6, 7, 11 and 12 that volume % of iron powder 1 in the composition for plug is same.

Further, it is seen from Comparative Example 4 that when using the plug made from the plasticizer and iron powder without the elastomer component and reinforcing filler, the damping performance is deteriorated as compared with Examples 1, 6, 7, 11 and 12 that volume % of iron powder 1 in the composition for plug is same.

From the comparison of Examples 16 and 17 preparing the plug from alumina powder or SiC powder instead of iron powder with Examples 1, 6, 7, 11, 12 and 15 that volume % of the powder in the composition for plug is same, it is seen that the damping performance is improved by using the metal powder, particularly iron powder as the powder.

From Comparative Example 5, it is seen that when the iron cylinder is used as a plug, the following property is bad.

From Examples 1-5 and 8, it is seen that when the content of the powder in the composition for plug is not less than 50 volume %, a more excellent damping performance is obtained, and when the content of the powder in the composition for plug is not less than 60 volume %, a more further excellent damping performance is obtained.

From Examples 2 and 9, it is seen that when the content of the powder in the composition for plug is not more than 74 volume %, the shape workability is further improved (concretely, it is possible to sufficiently remove air from the composition for plug in the shaping).

From Examples 6 and 10, it is seen that when the amount of the reinforcing filler compounded is not less than 60 parts by mass per 100 parts by mass of the elastomer component, a more excellent damping performance is obtained.

From Examples 7 and 11, it is seen that when the amount of the reinforcing filler compounded is not more than 150 parts by mass per 100 parts by mass of the elastomer component, the repetitive stability is good and the molding workability is improved (concretely, the milling of the composition becomes easy).

The invention claimed is:

1. A base-isolated structure comprising a laminate formed by alternately laminating rigid plates having a rigidity and elastic plates having an elasticity and having a hollow portion extending in the lamination direction and a plug pressed into the hollow portion of the laminate, characterized in that:
    the plug is a plug for base-isolated structure produced from a composition for plug in a base-isolated structure including an elastomer composition formed by compounding an elastomer component with a reinforcing filler, and iron powder, wherein the iron powder is in a mixture of various forms, and wherein a content of the iron powder is 50-74 volume %.

2. A base-isolated structure according to claim 1, wherein at least a part of the elastomer component is uncrosslinked.

3. A base-isolated structure according to claim 1, wherein the reinforcing filler is carbon black and/or silica.

4. A base-isolated structure according to claim 1, wherein an amount of the reinforcing filler compounded in the elastomer composition is 60-150 parts by mass per 100 parts by mass of the elastomer component.

5. A base-isolated structure according to claim 1, wherein the iron powder has a particle size of 0.1 μm-2 mm.

6. A base-isolated structure according to claim 5, wherein the particle size of the iron powder is 1 μm-150 μm.

* * * * *